United States Patent
De Boer et al.

(10) Patent No.: US 8,195,755 B2
(45) Date of Patent: Jun. 5, 2012

(54) MESSAGE DELIVERY IN MOBILE NETWORKS

(75) Inventors: Michel De Boer, Loenen aande vecht (NL); Ron Jesterhoudt, Almere (NL); Louis Van Der Stam, Haaften (NL); Klaas Wijbrans, Rijen (NL)

(73) Assignee: Markport Limited, Dublin (IE)

( * ) Notice: Subject to any disclaimer, the term of this patent is extended or adjusted under 35 U.S.C. 154(b) by 115 days.

(21) Appl. No.: 12/733,700

(22) PCT Filed: Sep. 19, 2008

(86) PCT No.: PCT/IE2008/000090
§ 371 (c)(1),
(2), (4) Date: Apr. 26, 2010

(87) PCT Pub. No.: WO2009/037685
PCT Pub. Date: Mar. 26, 2009

(65) Prior Publication Data
US 2010/0217817 A1    Aug. 26, 2010

Related U.S. Application Data

(60) Provisional application No. 60/960,209, filed on Sep. 20, 2007.

(51) Int. Cl.
*G06F 15/16* (2006.01)
(52) U.S. Cl. .................................................. 709/206
(58) Field of Classification Search ................... 709/206
See application file for complete search history.

(56) References Cited

U.S. PATENT DOCUMENTS

| | | | |
|---|---|---|---|
| 2007/0124398 A1* | 5/2007 | Parkinson et al. | 709/206 |
| 2007/0191035 A1* | 8/2007 | Huggett | 455/466 |
| 2007/0249379 A1* | 10/2007 | Bantukul | 455/466 |
| 2008/0016575 A1* | 1/2008 | Vincent et al. | 726/26 |
| 2008/0125146 A1* | 5/2008 | Bainbridge | 455/466 |

FOREIGN PATENT DOCUMENTS

| | | |
|---|---|---|
| WO | 96/03843 | 2/1996 |
| WO | 00/25533 | 5/2000 |
| WO | 2005/107291 | 11/2005 |

* cited by examiner

*Primary Examiner* — Ario Etienne
*Assistant Examiner* — Clayton R Williams
(74) *Attorney, Agent, or Firm* — Jacobson Holman PLLC

(57) ABSTRACT

When a device is switched off, all messages for that device are stored in different distributed service centers. For example, the message from user A may be stored in SMSC A and a message from user B in SMSC B where both subscribers and respective SMSCs can even belong to different networks. When the device is switched on again it notifies its presence to the network (performed by the MSC indicating this to the HLR). As a result of this alert, different service centers that have messages pending for that device will be notified that the device has come on-line again (performed by the HLR notifying SMSC A and SMSC B). Instead of directly sending out all messages, as in the prior art, each service center instead schedules the messages in an internal queue for delivery according to a local control scheme, which achieves synchronized delivery from multiple distributed SMSCs even though there is no centralised control. Each service center maps the 'age' of the message on its time axis as the time-to-deliver the message to the device. The deliveries are then sent out according to the derived schedule. As independent service centers all will base their decisions on the same length of the delivery schedule and same maximum retention time, the message deliveries of the different service centers will be interleaved with one another. This ensures that for significant time differences, messages from different service centers will still arrive in order at the device.

23 Claims, 3 Drawing Sheets

MESSAGE DELIVERY IN MOBILE NETWORKS

This is a national stage of PCT/IE08/000090 filed Sep. 19, 2008 and published in English, claiming benefit of U.S. provisional application No. 60/960,209, filed Sep. 20, 2007, hereby incorporated by reference.

FIELD OF THE INVENTION

The invention relates to message delivery in communication networks.

PRIOR ART DISCUSSION

Store and forward messaging systems like the multimedia messaging service (MMS) and short message service (SMS) often have to deal with high performance and scalability while at the same time providing in-sequence delivery of messages to end users. This is especially true in the case of for example content-related messages such as football alerts (where it would be unsatisfactory for the user experience to first know the result of the game and only then see the first goal).

Distributed messaging systems afford flexibility as regards message storage and delivery, allowing different messages for a particular subscriber to be stored on different nodes or message service centres. A message/message notification is delivered from that messaging system node or message service centre to the recipient regardless of where the recipient is located. However, as the different systems or message service centres are not synchronized messages may be delivered out of sequence when a device which had been unavailable comes on-line. This issue also holds true for geographically distributed messaging systems such as messaging systems under the control of different operators storing messages for a particular recipient.

For that reason, some kind of synchronization is needed when messages are stored persistently so that they will be sent out in sequence when the network triggers the message service centre that a device is reachable again.

Introducing synchronization of message delivery has heretofore involved either (a) a central control function, or (b) recipient-based subscriber distribution over the different nodes.

In approach (a) a single central scheduler component with awareness of all subscribers, is aware of all messages for a specific recipient across all systems. When a recipient is present again, this central scheduler tells each of the individual systems when to send out its message(s) for that subscriber. In approach (b) routing rules in the network ensure that all messages for a specific single recipient are stored in a single location. However, both approaches suffer from some or all of the following disadvantages:

- A single bottleneck to scalability may be introduced.
- More bandwidth may be required across WAN connections due to the storage for a specific recipient in a single location.
- Additional complexity due to the need to keep geographically distant systems synchronized.
- Additional communication, storage and processing overhead as a single multi-recipient submission has to be sent to multiple distant nodes.
- Less robust implementation as an outage of a specific node or location results in a service outage as those subscribers on that location no longer will be able to use the messaging service.
- Potential dependency on other network elements for routing messages to specific service centres based on recipient MSISDN.

Additionally, as operators each have their own independent implementations of messaging systems, traffic delivered by other operators will not be able to use a central control function, nor be able to use recipient-based subscriber distribution. This means even if a single operator has central control over his message delivery, messages delivered independently by other operators still will not be in sequence.

The invention addresses these problems.

GLOSSARY

CSCF Call Session Control Function
S-CSCF Serving Call Session Control Function
HLR Home Location Register
HSS Home Subscriber Server
IMS Internet Protocol Multimedia System
IMPS Instant Messaging and Presence Services
MMS Multimedia Messaging Service
MMSC Multimedia Messaging Service Centre
MSC Mobile Switching Centre
SIP Session Initiation Protocol
SMS Short Message Service
SMSC Short Message Service Centre
VAS Value Added Service
WAN Wide Area Network
WAP Wireless Application Protocol

SUMMARY OF THE INVENTION

According to the invention, there is provided a method for delivering a plurality of messages from a plurality of service centres to a user device when the device becomes available to receive a message, the method comprising the steps, performed by each service centre, of:

receiving one or more messages for delivery to the user device while it is not available to receive a message;
receiving an alert from an alerting element indicating that the device has become available to receive a message,
performing message delivery by
  locally determining according to parameters a message delivery time $T_D$ for each message, and
  delivering each message at or near its determined delivery time $T_D$, so that at least some of the messages are delivered from the plurality of service centres to the user device in a synchronised manner without use of a central schedule function.

In one embodiment, a parameter is arrival time $T_M$ of the message at the service centre.

In one embodiment, a parameter is arrival time $T_{alert}$ of the alert at the service centre.

In another embodiment, a parameter is a maximum retention time $\Delta T_{retention}$ for a message at a service centre, at a group of service centres, or at a logical group of service centres.

In one embodiment, a parameter is a configured period $\Delta T_{delivery}$ in which all retained messages will be delivered.

In a further embodiment, a mapping function is used to map all messages arrived between $T_{alert}-\Delta T_{retention}$ and $T_{alert}+\Delta T_{delivery}$ onto the delivery interval between $T_{alert}$ and $T_{alert}+\Delta T_{delivery}$.

In one embodiment, each service centre determines the delivery time $T_D$ according to a non-linear time mapping algorithm. This algorithm may be based on a continuous monotonic function such as a continuous monotonic piecewise linear function.

In one embodiment, each service centre determines the delivery time $T_D$ according to a linear time mapping algorithm. In one embodiment, this algorithm is.

$$T_D = T_{alert} + (T_M - (T_{alert} - \Delta T_{retention})) \times \frac{\Delta T_{delivery}}{\Delta T_{retention} + \Delta T_{delivery}}$$

where:

$T_{alert}$ is the arrival time of the alert at the service centre, indicating the device becoming available, $T_M$ is the arrival time of a message at the service centre, $\Delta T_{retention}$ is the maximum time that a message is retained by any of the service centres, and $\Delta T_{delivery}$ is the configured period in which all retained messages will be delivered.

In one embodiment, each service centre compensates for network latency delay in the transmission of the alert to the service centre.

The service centre may compensate by calculating a modified alert time according to the originating alerting element for the alert, and determining a message delivery time using this modified alert time. The modified alert time may be determined by adding a pre-configured delay retrieved from a look-up table having values for delay keyed on alerting element or group of alerting element s.

In one embodiment, the method comprises the step of the alerting element augmenting the alert with a time stamp indicating the time at which the device becomes available to receive a message, and the service centre determines the message delivery time using this time stamp as a parameter. The time stamp may be used instead of the parameter T_alert in the above linear algorithm. The service centres may not start determining the message delivery times until a time period has passed when it can be assumed that all service centres have received the alert, this being a fixed time period common to all service centres, which they all add to the time stamp.

In one embodiment, the time stamp is added to the MAP operation, 'MAP-ALERT-SERVICE-CENTRE'. In another embodiment, the time stamp is added to the SIP registration operation called 'REGISTER'.

In one embodiment, the service centres determine a delivery time only for certain categories of messages. In another embodiment, at least one service centre additionally determines the delivery time of each message according to category, or content, or a recipient, or an originator of a message. In one embodiment, the service centre inverts the sequence.

In one embodiment, at least some of the service centres are configured with at least some of the parameters by a device or application user, thus providing personalisation. The user may be a message originator or a message recipient.

In one embodiment, the method comprises the further step of at least one service centre arbitrating between conflicting or inconsistent parameters such as conflicting message originator settings and message recipient settings.

In one embodiment, the alerting element is a location register network element, such as a HLR or a HSS, a CSCF, or a presence server.

In one embodiment, the service centres are in different networks.

In one embodiment, before message delivery starts, a period is first reserved for the delivery of all messages for which explicit direct delivery has been requested, and after that, in-sequence delivery of the remaining messages is performed.

In one embodiment, the delivery time is determined only if in-sequence delivery is requested by a subscriber, an application, or any network element. In-sequence delivery may be requested by insertion of a flag in the message.

In another aspect, the invention provides a group of one or more communication network service centres adapted to perform the steps of any method defined above.

In a further aspect, the invention provides a computer program product comprising software code for performing operations of any method defined above when executing on a digital processor.

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

The invention ensures that when a device comes on-line, messages are delivered in a synchronised manner by independent service centres at different locations. This is achieved without any centralised control, each service centre automatically determining delivery times for its messages without being aware of what other service centres are doing. The effect is that the messages from the different service centres are interleaved for synchronisation even though the service centres do not communicate with each other to achieve this. The invention achieves this by using the single property that is available on all sites: time. Clock synchronization across the systems is not necessary as the service centres only need to correctly count relative time between receiving each message and receiving an alert indicating that the recipient device becomes available to receive a message.

Overall synchronisation across the multiple service centres is assured without the need for a centralized scheduler and without any coordination between the different service centres. Instead of blindly doing delivery attempts as fast as possible after an alert indicating a device has become available has been received, each service centre uses the time of arrival of a message and the time of arrival of the alert to determine the first moment to do a delivery attempt after the arrival of the alert. In this specification, the alert can arise upon any of a variety of situations where a device becomes available to receive a message. These include registration on the network, or absence of problems which prevented the device from receiving the message such as memory capacity on the device being exceeded. The example of device registration is mostly used in this specification.

Figure 1:
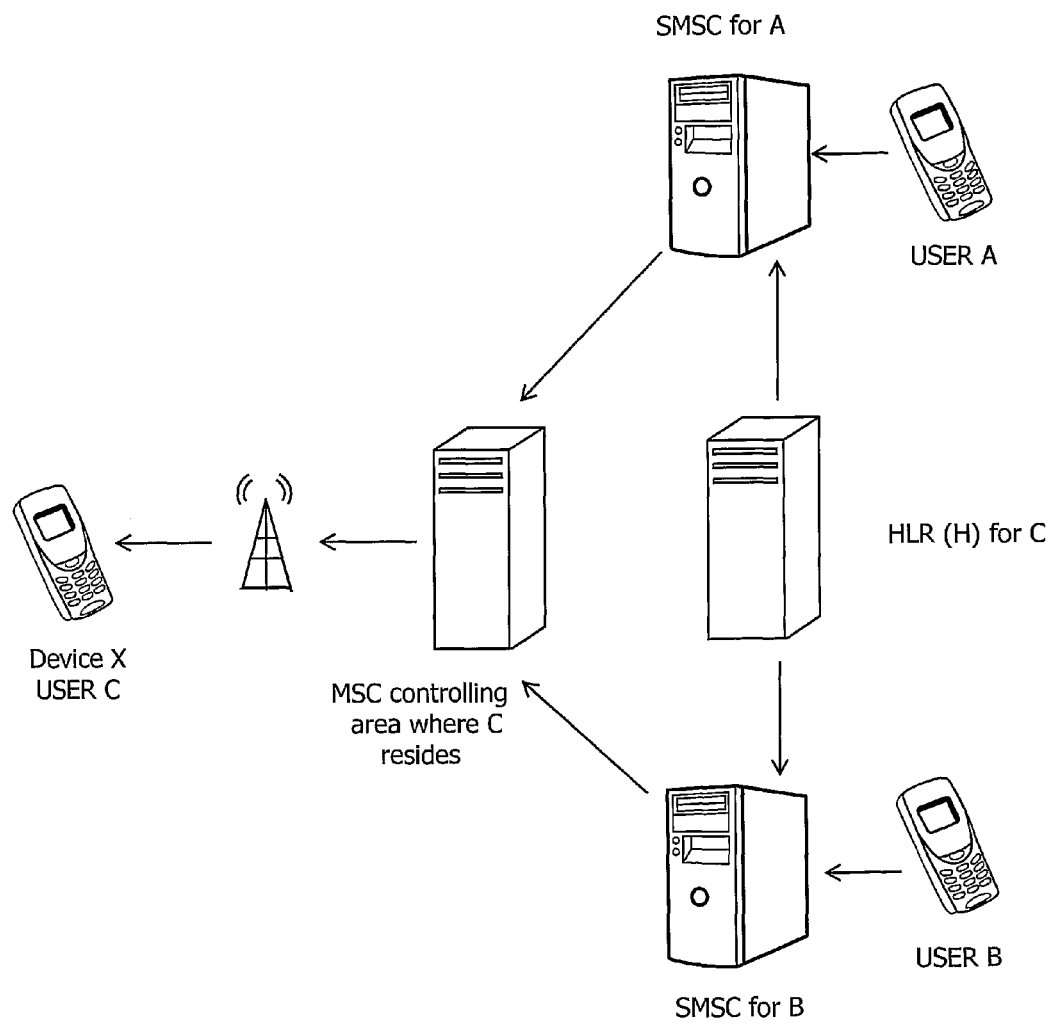
FIG. 1 is a block diagram showing subscriber mobile devices and network elements which deliver messages to them in accordance with the invention.
Figure 2:
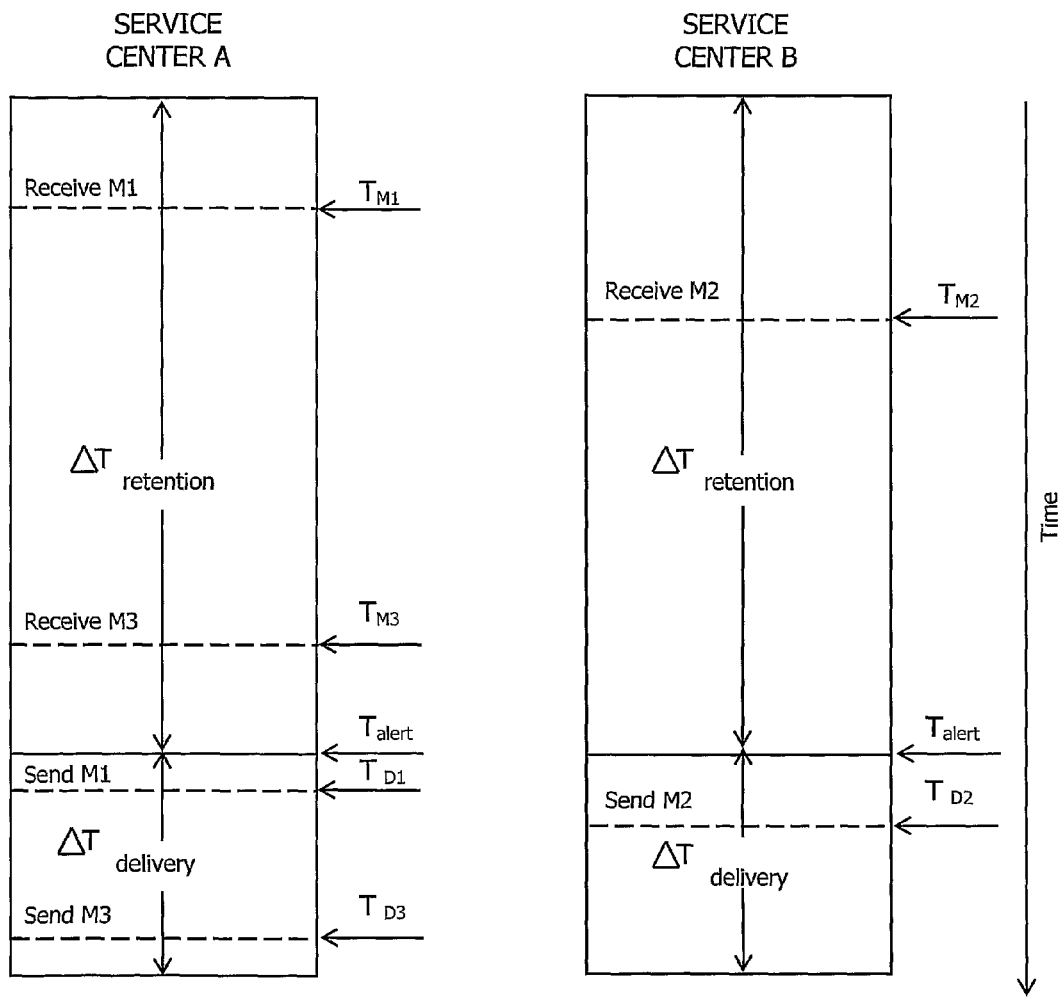
FIG. 2 is a diagram showing message delivery scheduling.

In more detail, and referring to FIGS. 1 and 2, when a device is switched off (as one example of it not being available to receive messages), all messages for that device are stored in the different distributed service centres (i.e., the message from user A in SMSC A and the message from user B in SMSC B where both subscribers and respective SMSCs can even belong to different networks). When the device is switched on again it notifies its presence to the network (performed by the MSC indicating this to the HLR). As a result of this alert, different service centres that have messages pending for that device will be notified that the device has come on-line again (performed by the HLR notifying SMSC A and SMSC B).

Instead of directly sending out all messages, as is currently done for all service centres, the service centre instead schedules the messages in an internal queue for delivery during a configurable time period. All new messages arriving at the service centre for that user device during this time period are appended to the queue.

Referring to FIG. 2, the service centre then maps the 'age' of the message on the time axis as the time-to-deliver the message to the device. The messages are then sent out by SMSC A and SMSC B according to their derived schedules so that the user experiences reception of synchronised messages, interleaved as appropriate, from the multiple service centres. The messages may be of any type, such as SMS or SIP messages, or notifications that MMS or WAP messages can be retrieved.

As independent service centres all will base their decisions on the same length of the delivery schedule and same maximum retention time, the message deliveries of the different service centres will be interleaved with one another. This ensures that for significant time differences, messages from different service centres will still arrive in order at the device.

In this embodiment an SMSC is assumed. In such a case, the HLR has the role of an alerting entity. However, the detailed event flow will be similar for an MMSC or a message service centre component in for example an IMS network (in that case for example a CSCF will have this role instead of the HLR).

When a message is submitted for delivery to device X (User C) using message service centre A, the message service centre will query the HLR H and find that the device is off-line. The message service centre A will then store the message and request the HLR H to notify it when the device comes on-line again. The time-stamp of arrival of the message is stored with the message in the message service centre.

When a second message is submitted for delivery to device X (User C), this may be done via message service centre B. In this case, message service centre B will query the HLR and find that the device is off-line. B will then store the message and request the HLR to notify it when the device comes on-line again. Also here, the time-stamp of arrival of the message is stored with the message in the message service centre.

When the device comes on-line, the HLR H notifies both service centre A and service centre B. Independently, both service centres now will do the same calculation, based on the following algorithm.

Let $T_M$ be the arrival time of a message at the service centre, then the delivery time $T_D$ can be calculated as follows:

$$T_D = T_{alert} + (T_M - (T_{alert} - \Delta T_{retention})) \times \frac{\Delta T_{delivery}}{\Delta T_{retention} + \Delta T_{delivery}}$$

Thus, each service centre maps the arrival times of the messages in the store (and newly arriving messages while still within the configured period for in-sequence deliveries) between $T_{alert}-\Delta T_{retention}$ and $T_{alert}+\Delta T_{delivery}$ to delivery times in the interval $T_{alert}$ to $T_{alert}+\Delta T_{delivery}$.

The following defines the parameters, in which $\Delta T$ denotes a relative time interval.

$T_{alert}$ is the arrival time at the service centre of the alert or notification of device X becoming available.

$\Delta T_{retention}$ is the maximum time, for linear time mapping, that a message is retained by any of the service centres (it is the time period the algorithm looks back from the arrival time of an alert for mapping messages on the time scale, which it only can do successfully if there are no messages older than $\Delta T_{retention}$). The linear algorithm requires the same value for this parameter on all the message service centres to achieve approximate in-sequence delivery across those message service centres. However $\Delta T_{retention}$ is not related to the actual storage/expiry period on any individual message service centre (the actual storage/expiry period can differ from message service centre to message service centre) as long as the value of $\Delta T_{retention}$ is >=the maximum of the storage/expiry period on any individual message service centre. This is particularly advantageous for geographically distributed messaging systems such as for example messaging systems under the control of different operators, where in practical terms it is likely to be easier to align them on a common $\Delta T_{retention}$ value, than to align the actual storage/expiry period that they employ. Advantageously, by having a common value for $\Delta T_{retention}$ for all service centres concerned, approximate in-sequence delivery is achieved even where the service centres are not directly related, for example, multiple service centres under control of a single operator or different operators.

Further, the invention can be advantageously employed where there are logical groupings of message service centres, where such groupings for example are largely service independent, to have unique $\Delta T_{retention}$ values per group. Thus for example one can envisage a group of SMSCs (or a distributed SMSC comprising several message centre nodes) dedicated to Value Added Service (VAS) messaging traffic and another group of SMSCs (or a distributed SMSC comprising several message centre nodes) dedicated to peer-to-peer messaging, both groups employing different $\Delta T_{retention}$ values, resulting advantageously in per group in sequence delivery.

$\Delta T_{delivery}$ is the configured period in which all retained messages will be delivered. All retained messages will be delivered in the time period from $T_{alert}$ to $T_{alert}+\Delta T_{delivery}$.

Execution of the above algorithm results in the planned time-line of delivery attempts according to FIG. 2. Subsequently, each of the message service centres will do its own deliveries at the appropriate moments in time. So, at $T_{D1}$ message service centre A will request the location of the device X from HLR H, and deliver the message or the notification for the stored message to the device. At $T_{D2}$ message service centre B will request the location of the device X from HLR H, and deliver the message or the notification for the stored message to the device. When shown on the time-line, this results in the combined delivery schedule of message service centre A and message service centre B. As a result, to the end user perception the messages of these service centres have arrived in sequence, even though the message service centres themselves had no knowledge of one another's existence.

In one embodiment, the local sequencing performed by each SMSC is performed by an additional function of the known scheduler of the SMSC. When a message arrives at the SMSC and there are no messages queued, the scheduler can attempt the delivery. If the delivery is successful the queue is empty again. When one or more messages are already queued, the message is queued and the scheduler waits for the HLR alert. When the alert arrives, the $T_D$ (delivery time) is calculated for the oldest message in the queue and the scheduler attempts the delivery of that message at that time. When a positive delivery response is received, the message can be removed from the queue and the procedure repeats itself until the queue is empty or a negative delivery response is received. After receiving a negative delivery response (eg. indicating that the user device is out of coverage) the scheduler stops delivering and starts waiting for the delivery trigger again.

In one embodiment, each service centre may compensate for network latency delay in the transmission of the alert to the service centre, if it is known that delay from the alerting elements may vary across the network for different message service centres.

Compensation may be achieved by each service centre modifying T_alert according to the originating alerting element for the alert, and determining a message delivery time using this modified alert time.

The modified alert time T_alert may be calculated by adding a configured delay period to the original T_alert based on location of the service centre relative to the originating alerting element or group of alerting elements. Each service centre has a table of configured delays keyed on alerting element or group of alerting elements. There is thus, in the overall system of M service centres and N alerting elements (or group of alerting elements), a delay value for each association of service centre and alerting element (or group of alerting elements).

In a further embodiment, the alerting element such as a HLR includes a parameter carrying a registration time value for the device on the network. In this approach, the service centres use the time stamp in the alert rather than the time of arrival of the alert. Thus, the service centres and the alerting element(s) need to be reasonably well synchronised with real time. Also, the service centres should not start determining the message delivery times until a time period has passed when it can be assumed that all service centres have received the alert. This is a fixed time period common to all service centres, which they all add to the time stamp. The service centres calculate the message delivery times according to any of the above algorithms, in which T_alert is given a value of this time stamp plus the common fixed time period. The time stamp may be added to the MAP operation, 'MAP-ALERT-SERVICE-CENTRE'. Alternatively, the time stamp may be added to a SIP registration operation called 'REGISTER', for example in an IMS context. A change to the standards would be required to incorporate such a parameter. The time stamp may of course be added in different technologies, using the relevant operation, and this may also involve change to the relevant standards.

Figure 3:
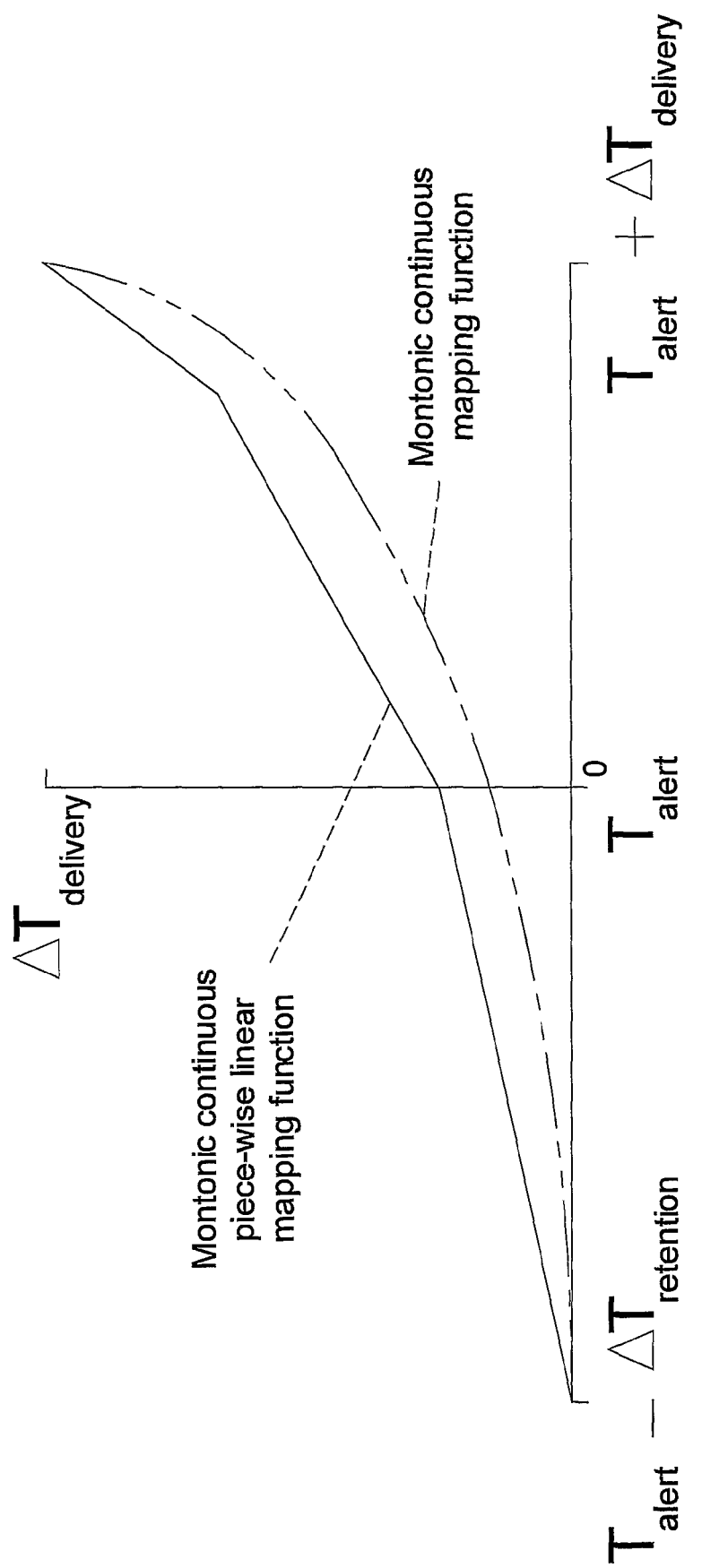
FIG. 3 is a plot showing mapping functions.

Additionally, the invention can deal with the potential problem where the granularity of the delta time in the schedule is so small that the service centres schedule the message for delivery in the same instant. Another potential problem is that the number of messages waiting at a single service centre is so large that their delivery requires more time than the other service centre will use for delivering its next message. These potential problems are avoided by introducing a non-linear mapping function. In practice, the importance of having the exact in-sequence delivery decreases with the amount of time that has passed. By introducing a non-linear mapping function, the time scale can be compressed more for older messages and be a linear time-scale for recent messages. The service centres have the ability to perform a non-linear time compression. For example, suppose the delivery schedule spans a three day period and the planned delivery period $\Delta T_{delivery}$ spans three minutes, one could project the first 1½ day on the first minute, then a full day on the second minute and the last ½ day on the last minute. But in principle, any mathematical strictly monotonic function can be used. This is especially relevant if the $\Delta T_{retention}$ is large. Please refer to FIG. 3.

The service centres may have the ability to work with $\Delta T_{retention}$ that is less than the maximum retention time of all the service centres. In this case $\Delta T_{retention}$, retention stands for the time period the algorithm looks back from the arrival time of an alert in determining which messages need to be delivered in sequence. For messages older than $\Delta T_{retention}$ there are multiple refinements possible:

they are delivered directly at the start of the $T_{alert}$ interval;
they are delivered in an additional interval introduced before the actual sequenced delivery starts; or
they are delivered after the sequenced delivery has been performed.

In any of these cases there is no limitation on the age of messages in the service centre for the algorithm to still function correctly for messages which arrived in the interval of interest.

The service centres may have the ability to perform in-sequence delivery for specific messages based on their content, addressees or originator, such as for example messages from friends and family (which are likely to be part of larger conversations) or messages from specific large accounts only (so that for example football goals arrive in-sequence but weather news or stock exchange news is delivered directly).

The service centres may have the ability to invert the delivery sequence for specific messages based on their content, addressees or originator, such as for example stock exchange messages or voice mail notifications by using a negative mapping function ensuring that the newest messages are sent first and the oldest messages last across all distributed message service centres.

The service centres may have the ability to perform (approximate) in-sequence delivery within networks of different operators. As the service centres are in no way coupled directly even if they do rely on communication with the HLR for the reception of the alerts (which is a standardized interface), approximate in-sequence message delivery can be ensured even across multiple operators once these operators agree on the same parameters for the time-mapping scheme.

The service centres may have the ability for recipients (which can be users or applications such as Value Added Service (VAS) applications) to personalize their delivery settings, indicating when in-sequence delivery is required and when not, based on various parameters such as but not limited to originator address, message age, total number of messages, message associated with a specific service.

The service centres may have the ability for originators (which can be users or applications such as Value Added Service (VAS) applications) when submitting a message or in their preferences/profile to explicitly indicate that a specific message or a message associated with a specific service has to be delivered in sequence or directly.

A further refinement is where before the in-sequence delivery starts, a period is first reserved for the delivery of all messages for which explicit direct delivery has been requested. After that the delivery of the in sequence messages is done.

It will be appreciated that the invention achieves distributed approximate message sequencing through time compression, delivering stored messages to handsets just turned on by independent message service centres without any need of communication between message service centres. As a result of this, not only messages from different geographically distributed service centres in the same operator network can be delivered more efficiently, but also messages can be delivered in the original sequence across operators if operators agree on the same parameters of the time compression scheme. Though described for SMS, the scope is much more general as it in principle covers any kind of store and forward messaging where a handset triggers its availability when being switched on, including but not limited to MMS, IMS and IMPS.

The invention is not limited to the embodiments described but may be varied in construction and detail.

The invention claimed is:

1. A method for delivering a plurality of messages from a plurality of service centers to a user device when the device becomes available to receive a message, the method comprising the steps, performed by each service center, of:
receiving one or more messages for delivery to the user device while it the user device is not available to receive a message;
receiving an alert from an alerting element indicating that the device has become available to receive a message, performing message delivery by:
locally determining according to parameters a message delivery time $T_D$ for each message, and
delivering each message at or near its determined delivery time $T_D$, so that at least some of the messages are delivered from the plurality of service centers to the user device in a synchronized manner in terms of order of the service centers receiving the messages,
wherein each service center determines the delivery time $T_D$ according to a linear time mapping algorithm, or a non-linear time mapping algorithm, and
wherein the linear time mapping algorithm is:

$$T_D = T_{alert} + (T_M - (T_{alert} - \Delta T_{retention})) \times \frac{\Delta T_{delivery}}{\Delta T_{retention} + \Delta T_{delivery}}$$

where:
$T_{alert}$ is the arrival time of the alert at the service center, indicating the device becoming available,
$T_M$ is the arrival time of a message at the service center,
$\Delta T_{retention}$ is the maximum time that a message is retained by any of the service centers, and
$\Delta T_{delivery}$ is the configured period in which all retained messages will be delivered; and
wherein the non-linear time mapping algorithm is based on a continuous monotonic piece-wise linear function.

2. The method as claimed in claim 1, wherein each service center compensates for network latency delay in the transmission of the alert to the service center.

3. The method as claimed in claim 1, wherein a parameter is arrival time $T_{alert}$ of the alert at the service center; wherein each service center compensates for network latency delay in the transmission of the alert to the service center; and wherein the service center compensates by calculating a modified alert time according to the originating alerting element for the alert, and determining a message delivery time using this modified alert time.

4. The method as claimed in claim 3, wherein the modified alert time is determined by adding a pre-configured delay retrieved from a look-up table having values for delay keyed on alerting element or group of alerting elements.

5. The method as claimed in claim 1, wherein each service center compensates for network latency delay in the transmission of the alert to the service center, and the method comprises the step of the alerting element augmenting the alert with a time stamp indicating the time at which the device becomes available to receive a message, and the service center determines the message delivery time using this time stamp as a parameter.

6. The method as claimed in claim 1, wherein each service center determines the delivery time $T_D$ according to said linear time mapping algorithm, and $$T_D = T_{alert} + (T_M - (T_{alert} - \Delta T_{retention})) \times \frac{\Delta T_{delivery}}{\Delta T_{retention} + \Delta T_{delivery}}$$

wherein each service center compensates for network latency delay in the transmission of the alert to the service center;
wherein the method comprises the step of the alerting element augmenting the alert with a time stamp indicating the time at which the device becomes available to receive a message, and the service center determines the message delivery time using this time stamp as a parameter; and
wherein the time stamp is used instead of the parameter T_alert in the algorithm.

7. The method as claimed in claim 5, wherein the service centers do not start determining the message delivery times until a time period has passed when it can be assumed that all service centers have received the alert, this being a fixed time period common to all service centers, which they all add to the time stamp.

8. The method as claimed in claim 5, wherein the time stamp is added to a MAP operation, 'MAP-ALERT-SERVICE-CENTRE'.

9. The method as claimed in claim 5, wherein the time stamp is added to a SIP registration operation called 'REGISTER'.

10. The method as claimed in claim 1, wherein the service centers determine a delivery time only for certain categories of messages.

11. The method as claimed in claim 1, wherein at least one service center additionally determines the delivery time of each message according to category, or content, or a recipient, or an originator of a message.

12. The method as claimed in claim 11, wherein the service centers invert a predetermined sequence.

13. The method as claimed in claim 1, wherein at least some of the service centers are configured with at least some of the parameters by a device or application user, thus providing personalization.

14. The method as claimed in claim 13, wherein the user is a message originator.

15. The method as claimed in claim 13, wherein the user is a message recipient.

16. The method as claimed in claim 1, comprising the further step of at least one service center arbitrating between conflicting or inconsistent parameters.

17. The method as claimed in claim 1, wherein the alerting element is a location register network element.

18. The method as claimed in claim 1, wherein the service centers are in different networks.

19. The method as claimed in claim 1, wherein before message delivery starts, a period is first reserved for the delivery of all messages for which direct delivery has been explicitly requested, and after that, synchronized delivery of the remaining messages is performed.

20. The method as claimed in claim 1, wherein the delivery time is determined only if synchronized delivery is requested by a subscriber, an application, or a network element.

21. The method as claimed in claim 20, wherein synchronized delivery is requested by insertion of a flag in the message.

22. A group of one or more communication network service centers adapted to perform the steps of a method as claimed in claim 1.

23. A non-transitory computer readable medium comprising a computer program product comprising software code for performing operations of a method of claim 1 when executing on a digital processor.

* * * * *